April 7, 1970  T. C. VOGT, JR., ET AL  3,504,747
FORMATION ACIDIZING
Filed March 21, 1968  2 Sheets-Sheet 1
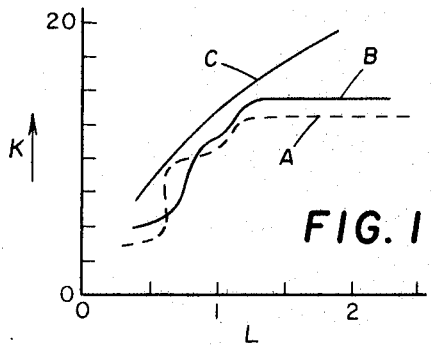
FIG. 1A
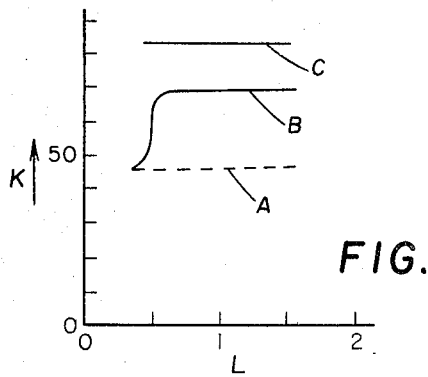
FIG. 1B
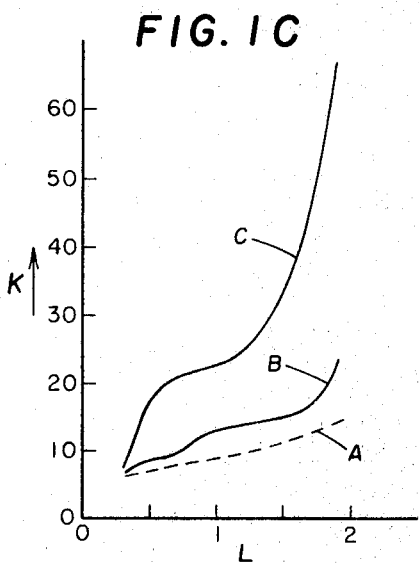
FIG. 1C
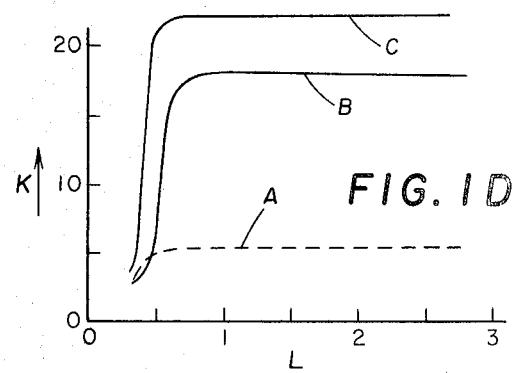
FIG. 1D
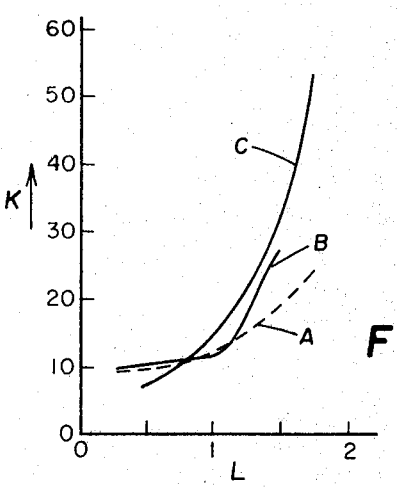
FIG. 1E
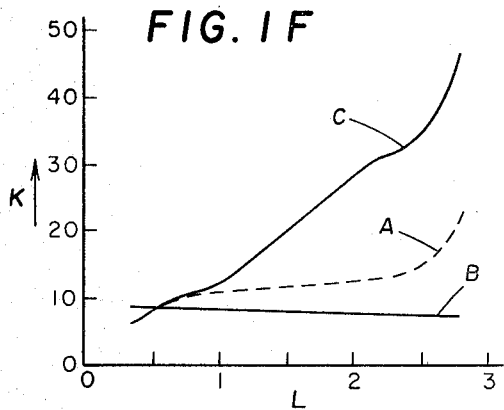
FIG. 1F
THOMAS C. VOGT, JR.
JOHN L. FITCH
INVENTORS
BY 
ATTORNEY

THOMAS C. VOGT, JR.
JOHN L. FITCH
INVENTORS

BY *William R. Jackson*
ATTORNEY

United States Patent Office 3,504,747
Patented Apr. 7, 1970

3,504,747
FORMATION ACIDIZING
Thomas C. Vogt, Jr. and John L. Fitch, Dallas, Tex., assignors to Mobil Oil Corporation, a corporation of New York
Filed Mar. 21, 1968, Ser. No. 715,072
Int. Cl. E21b 43/27
U.S. Cl. 166—307　　　　　　　　　　　　　　16 Claims

ABSTRACT OF THE DISCLOSURE

This specification discloses a method of acidizing a subterranean formation. A mixture of an acid gas such as hydrogen chloride and a diluent gas is forced into the formation from the well. As the gaseous mixture travels through the formation, the acid gas dissolves in water contained therein to form an acid which attacks acid-reactive formation materials such as carbonates. The presence of the diluent gas in the injected mixture increases the penetration depth of the treatment. Subsequent to introduction of the acid gas-diluent mixture, water may be injected into the formation in order to remove solid plugging deposits and effect further increase in permeability.

BACKGROUND OF THE INVENTION

This invention relates to the acidizing of subterranean formations and, more particularly, to a new and improved process for increasing the effective depth of an acidizing treatment in a formation surrounding a wellbore.

It is a common practice to acidize subterranean formations in order to increase the perameability thereof. For example, in the petroleum industry it is conventional to inject an acidizing fluid into a well in order to increase the permeability of a surrounding hydrocarbon-bearing formation and thus facilitate the flow of hydrocarbon fluids into the well from the formation or the injection of fluids, such as gas or water, from the well into the formation. Such acidizing techniques may be carried out as "matrix acidizing" procedures or as "acid fracturing" procedures. In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation. In matrix acidizing, the acidizing fluid is passed into the formation from the well at a pressure below the breakdown pressure of the formaton. In this case, increase in permeability is effected primarily by the chemical reaction of the acid within the formation with little or no permeability increase being due to mechanical disruptions within the formation as in fracturing. In yet another technique involving acidizing, the formation is fractured and particle propped with an acid-insoluble propping agent. Thereafter, an acidizing fluid is injected into the formation at a pressure below the fracturing pressure. The acid functions to dissolve formation materials forming the walls of the fracture, thus increase the width thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent the well. Thus, the acid becomes spent before it penetrates into the formation a significant distance from the well. For example, in matrix acidizing of a limestone formation it is common to achieve maximum penetration with a live acid to a depth of only a few inches to a foot from the face of the wellbore. This, of course, severely limits the increase in productivity or injectivity of the well.

In order to increase the penetration depth it has heretofore been proposed to add a reaction inhibitor to the acidizing fluid. For example, in U.S. Patent No. 3,233,672 to N. F. Carpenter there is disclosed an acidizing process in which inhibitors sucvh as alkyl-substituted carboximides and alkyl-substituted sulfoxides are added to the acidizing solution. Another technique for increasing the penetration depth of an acidizing solution is that disclosed by Patent No. 3,076,762 to W. R. Dill, wherein solid, liquid, or gaseous carbon dioxide is introduced into the formation in conjunction with the acidizing solution. The carbon dioxide acts as a coolant thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Patent No. 2,850,098 to Moll et al. involves the removal of contaminates from a water well and the adjacent formation through the injection of gaseous hydrogen chloride. Still another technique for acidizing a calcareous formation is disclosed in U.S. Patent No. 3,354,957 to Every et al. In this process liquid anhydrous hydrogen chloride is forced from a well into the adjacent formations. The liquid hydrogen chloride vaporizes within the formation and the resulting gas dissolves in the formation water to form hydrochloric acid which then attacks the formation.

SUMMARY OF THE INVENTION

In accordance with the present invention, there is provided a method of acidizing a water-containing, subterranean formation penetrated by a well whereby the acid treatment penetrates into the formation to an acceptable depth from the well. In carrying out the invention, a mixture of an acid gas and a diluent gas is forced from the well into the formation. The presence of the diluent gas decreases the amount of acid gas which dissolves in the formation water for any given formation system of a specified pressure, pore volume, water saturation and gas saturation. Thus, for a unit volume of formation adjacent to the well, the amount of ionized acid available for reaction with acid-reactive material within the formation is decreased with the result that for a given quantity of acid, the volume of formation subject to acidizing treatment is increased, and, in addition, the tendency of the pores to become plugged with reaction products is reduced. Deep penetration of acid into the formation is effected by reducing the quantity of water present in a given volume of the formation thereby limiting the amount of reaction which can occur between the acid and the acid-reactive formation material.

In a preferred embodiment of the invention, the concentration of the acid gas in the injection mixture is within the range of 30 to 80 percent by volume and, even more desirably, within the range of 60 to 80 percent by volume. In another aspect of the invention, water is injected subsequent to the mixture of acid gas and diluent gas in order to further effect a permeability increase in the formation.

BRIEF DESCRIPTION OF THE DRAWINGS

FIGURES 1A through 1F are graphs illustrating permeability profiles of cores used in laboratory tests of the invention;

DESCRIPTION OF SPECIFIC EMBODIMENTS

Figure 3:
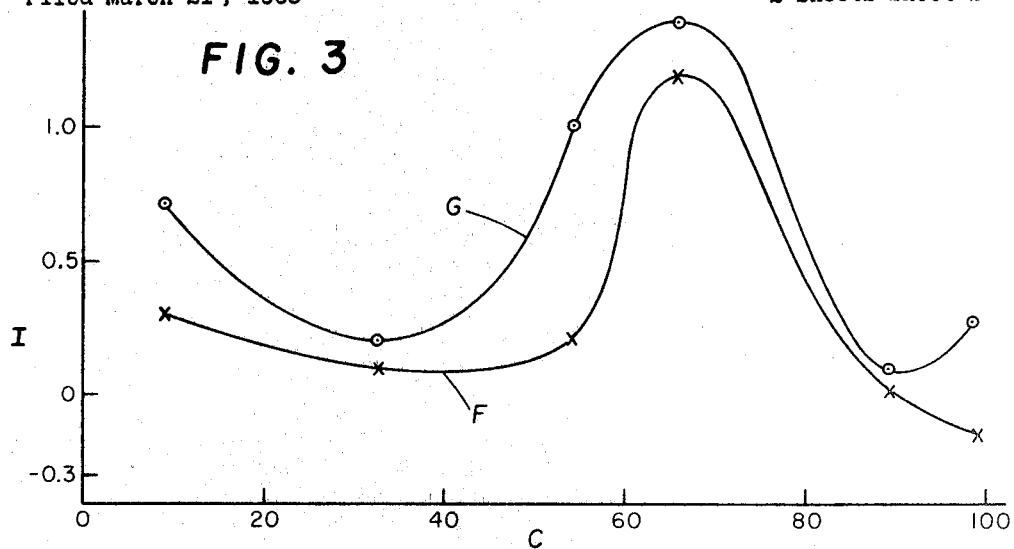
FIGURE 3 is a graph illustrating average permeability improvements adjusted for acid consumption.

The acid gas used in carrying out the invention may be of any suitable type which will ionize in water within the formation to form an acid reactive with formation material. The primary application of the invention is in the treatment of calcareous formations and it usually will be desirable to utilize an acid gas such as anhydrous hydrogen chloride, hydrogen bromide, or hydrogen iodide which is strongly ionizable in aqueous solution. Of these, hydrogen chloride is preferred because of its ready availability and relatively low cost. Acid gases such as anhydrous hydrogen fluoride and sulfuric acid anhydride (sulfur trioxide) that form acids which react with the formation carbonates to produce water-insoluble calcium salts normally should be avoided since such salts will tend to plug the formation as the acid becomes neutralized. The invention will be described in detail herein with reference to the preferred acid gas, hydrogen chloride.

As is well known to those skilled in the art, the reaction rate of an acid with formation carbonates is approximately proportional to the instantaneous hydrogen ion concentration. Anhydrous hydrogen chloride is not ionized, whereas hydrogen chloride in aqueous solution is almost completely ionized such that the instantaneous hydrogen ion concentration is approximately equivalent to the hydrogen chloride concentration. Therefore, for a system of any given quantities of water, hydrogen chloride, and carbonate, the reaction rate between the hydrogen chloride and carbonate will depend upon the amount of hydrogen chloride in aqueous solution.

In a gas-mixture liquid system the amount of a given gas which will dissolve in the liquid is independent of the total pressure on the system. The solubilities of the individual gases in a gaseous mixture are approximately proportional to their respective partial pressures, with the solubility of each gas being independent of the presence of the other gases. In the present invention this phenomenon is utilized to advantage by injecting into the formation to be acidized a mixture of an acid gas, e.g., gaseous hydrogen chloride, and a diluent gas such as nitrogen, carbon dioxide, methane, or mixtures thereof. Other inert gases such as helium, neon, and argon may be used although these usually will be economically unattractive.

Subterranean hydrocarbon formations typically contain naturally-occurring water, referred to variously as formation water or connate water. As the mixture of gaseous hydrogen chloride and diluent gas enters the formation from the wellbore, the hydrogen chloride immediately dissolves in the formation water and becomes ionized such that it reacts with the formation carbonate materials and increases the permeability of the formation in the vicinity of the well. However, for a given gas-water system the amount of hydrogen chloride which goes into aqueous solution adjacent the well is decreased by the presence of the diluent gas which limits the amount of hydrogen chloride available for contact with the formation water. As the hydrogen chloride travels through the formation, it continues to dissolve in formation water to form hydrochloric acid which attacks carbonates at increasing depths into the formation. As noted previously, any available gas which is relatively inert may be used as a diluent gas in carrying out the invention. Carbon dioxide, nitrogen, and methane usually will be preferred from the standpoint of economy and their chemical and physical characteristics.

In carrying out the present invention, the hydrogen chloride and diluent gas may be introduced into the well as a mixture at the wellhead. Alternatively, the hydrogen chloride and diluent gas may be introduced separately at the wellhead and allowed to form a mixture within the well. Thus, where anhydrous hydrogen chloride is available in liquid form in high pressure containers, the hydrogen chloride may be bled directly from such containers into the well. Concomitantly therewith the nitrogen or other diluent gas may be injected separately into the well at a rate such that the diluent gas and hydrogen chloride become mixed in the proper proportions as they travel downwardly through the well.

It is highly desirable that the well contain little or no water so that the hydrogen chloride is anhydrous or substantially anhydrous as it enters the formation. Thus, it is preferred in carrying out the invention to precede the hydrogen chloride-diluent gas mixture with an inert gas to displace such water as may be accumulated in the bottom of the well back into the formation. The gas used in this step of the invention normally will be the same as that employed as the diluent gas in the acidizing mixture. Even where the well does not contain an accumulation of water, the prior gas injection step is desirable as a pre-flush in order to displace water in the portion of the formation adjacent the well further back into the formation in order to obtain a decreased acid reaction rate adjacent the wellbore.

In the acidizing of a calcareous formation, one mole of calcium salt is produced for each mole of calcium carbonate which enters into the reaction. For example, the overall reaction between hydrochloric acid and calcium carbonate may be expressed by the following equation:

$$CaCO_3 + 2HCl \rightarrow CaCl_2 + CO_2 + H_2O \qquad (1)$$

The calcium chloride may acquire water of crystallization within the formation to form the monohydrate, dihydrate, or hexhydrate of calcium chloride. These materials are less dense than calcium carbonate and, in the absence of sufficient water within the formation to solubilize them, present a greater solids volume than the reactant calcium carbonate. Thus, in the absence of adequate water saturation within the formation, one would expect the formation to become plugged with a resultant decrease in porosity and permeability.

The amount of reaction occurring in accordance with Equation 1 may be limited by the amount of hydrogen chloride present or by the amount of water present. As the reaction occurs, hydrogen chloride is consumed and water is bound up in the calcium chloride reaction product to form hydrates as described above. At the same time, the diluent gas penetrates further into the formation, carrying with it water which is not held in place by forces such as capillary action. Each additional amount of the gas mixture injected produces a similar effect but in a region further removed from the well since no further reaction can occur near the well after the supply of formation water is exhausted.

In tests carried out regarding the present invention the effect of calcium chloride hydrate deposits within core samples has been observed as a decrease in porosity. However, notwithstanding this porosity effect, these tests resulted in appreciable permeability enhancement except in those cases in which only a very low concentration of diluent gas was present in the acidizing mixture. While no absolute explanation of this observed phenomenon is available, it is thought likely that some mass transport of the produced calcium chloride takes place in the formation with the result that most of it is deposited within relatively large pore spaces of the formation. For example, considering a formation system comprised of small and large pore spaces, the calcium chloride produced by the hydrochloric acid-calcium carbonate reaction adjacent a small pore space is transported to and deposited within an adjacent, relatively large pore space. In this case, the net result is a decrease in tortuosity within the formation which more than compensates for the decrease in porosity to produce an overall increase in permeability.

While the treatment of the formation with the acid gas-diluent gas mixture normally produces a marked increase in formation permeability, increased beneficial results may be achieved in many instances by the subsequent injection of water. Thus, in a preferred embodiment of the invention, a slug of water is injected from the well into the formation subsequent to the introduction of the acid gas-diluent gas mixture. As the water travels outwardly through the formation it dissolves the produced calcium chloride with a resultant decrease of the solids volume of the formation. It usually will be desirable to dissolve an alkali metal or ammonium salt such as sodium chloride in the injected water in order to minimize swelling of water-sensitive clays which may be present in the formation. In addition, it is desirable that the water be acidified slightly in order to adjust its pH to a value below 7.

If desired, injection of the acid gas-diluent gas mixture and water may be repeated. Thus, the acid gas-diluent gas may be followed by water which in turn is followed by the injection of an inert gas in order to decrease the water saturation in the formation adjacent the well. Thereafter, a second slug of acid gas-diluent gas mixture may be forced into the formation and this again may be followed by a slug of water in order to dissolve calcium chloride hydrate formed during the second acid treatment step.

As noted previously, hydrocarbon-bearing formations normally exhibit a connate water saturation. However, in some cases, particularly in gas-bearing formations which contain little or no crude oil, the formation water saturation may be very low or even non-existent. In this case, it is desirable in carrying out the present invention to proceed the acid treatment of the formation with a water injection step. Subsequent to the injection of water, an inert gas is injected from the well into the formation in order to reduce the water saturation to an acceptable level as indicated above and thereafter the acid gas-diluent gas mixture may be introduced.

In certain experiments carried out with respect to the present invention, limestone cores were acidized in the laboratory utilizing hydrogen chloride-nitrogen mixtures of various concentrations. The cores utilized in these experiments were one-inch in diameter, varied in length from about one and one-half- to three- inches, and exhibited a 97 to 99 weight percent solubility in five molar hydrochloric acid solution.

The experimental procedure used was as follows. The cores were treated in an extractor in order to remove substantially all hydrocarbons therefrom and then were dried at a temperature of 180° F. for approximately 24 hours. The permeability profile of each core was measured by means of a multi-tap permeability cell of the type disclosed in U.S. Patent No. 2,821,680 to M. L. Slusser et al. Thereafter, moist air was passed through the cores in order to achieve a water saturation somewhat similar to the connate water saturation existing under natural formation conditions.

In the next step of the experimental procedure, the cores were acidized utilizing a nitrogen-hydrogen chloride mixture. For each core, the nitrogen-hydrogen chloride mixture was introduced at one end under an initial inlet pressure of 300 p.s.i.g. and a temperature of 77° F. and the exhaust gas flow from the other end of the core was controlled at a rate of approximately 15 cubic centimeters per minute.

Subsequent to the acidizing step, each core was again dried and a permeability profile was obtained utilizing the multi-tap cell. The cores then were flooded with water in order to remove the calcium chloride reaction product present within the core. The water used in this step contained two percent by weight of sodium chloride in order to avoid swelling water-sensitive clays present in the core. In addition, the pH of the washing solution was adjusted to a value of about two in order to avoid drastic changes in pH conditions of the cores. After the washing step, each core was dried and a permeability profile was again obtained utilizing the multi-tap cell.

Turning now to the drawings, FIGURES 1A through 1F are permeability profiles obtained for various hydrogen chloride-nitrogen concentrations with the premeability K plotted on the ordinate and the length L along the core in inches plotted on the abscissa. In each of these figures, the broken line A indicates the permeability profile before the acidizing step, the line B indicates the permeability profile after acidizing but before injection of the aqueous washing solution, and the line C indicates the permeability profile after injection of the washing solution. In each of FIGURES 1A through 1F the direction of flow of the hydrogen chloride-nitrogen mixture and the washing solution is from right to left. The concentration of hydrogen chloride in the hydrogen chloride-nitrogen mixture is 9, 33, 55, 66, 89, and 100 percent by volume for FIGURES 1A, 1B, 1C, 1D, 1E, and 1F, respectively.

From an examination of FIGURES 1B, 1C, and 1D, it can be seen that good acid penetration and permeability improvements were obtained for hydrogen chloride concentrations of 33, 55, and 66 percent. At hydrogen chloride concentrations of 9 and 89 percent some permeability improvement was obtained although the permeability near the exhaust end of the core showed little or no improvement. At a concentration of 100 percent hydrogen chloride (FIGURE 1F) the acidizing step resulted in a reduction of permeability throughout substantially the entire length of the core. For each of the various hydrogen chloride concentrations, permeability improvement was obtained throughout all or most of the lentgh of the core by injection of the aqueous washing solution. This is attributed to the removal of the solid calcium chloride reaction product formed uring the acidizing step.

Figure 2:
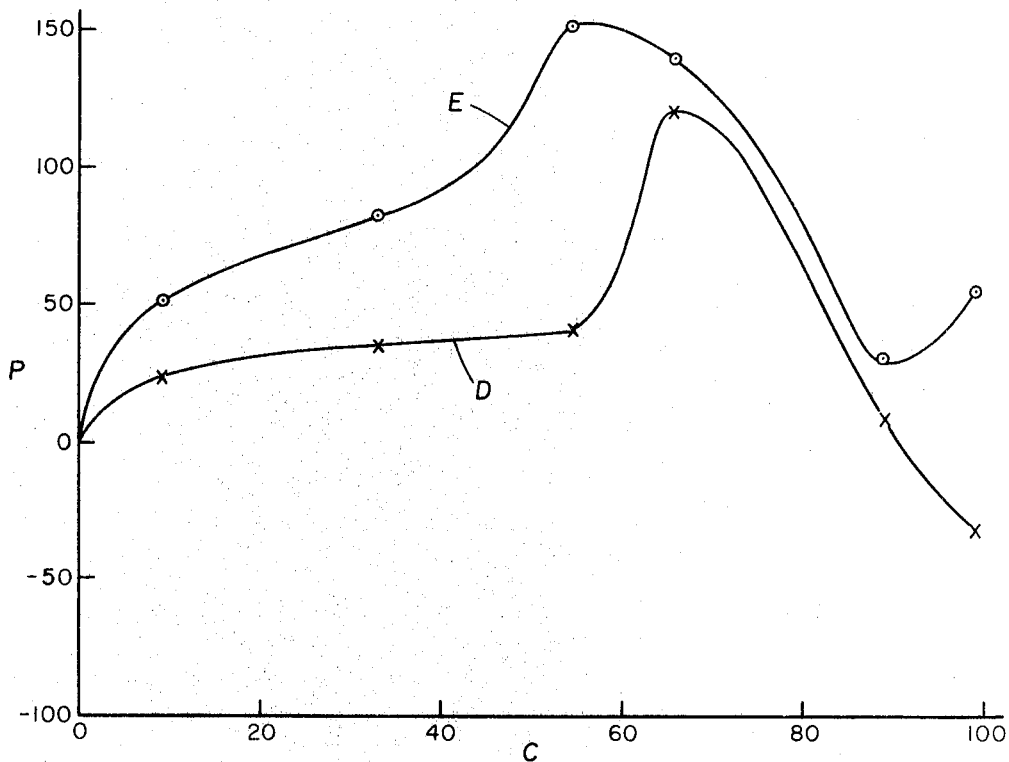
FIGURE 2 is a graph illustrating average permeability improvements obtained during such tests.

Turning now to FIGURE 2, there is illustrated the effect of hydrogen chloride concentration on the change in average permeability, both after acidizing but before washing and after both acidizing and washing. In FIGURE 2 the percentage increase P in average permeability is plotted on the ordinate and the concentration C in volume percent of hydrogen chloride in the hydrogen chloride-nitrogen mixture is plotted on the abscissa. Curve D in FIGURE 2 illustrates the percentage increase in permeability obtained after acidizing and curve E indicates the percentage increase in permeability obtained after completion of the washing step. As shown by curve D, the maximum permeability increase is obtained through use of an acidizing mixture of about two parts hydrogen chloride to one part nitrogen. On either side of this point the beneficial effect of the treatment falls off rapidly and for hydrogen chloride concentrations of more than about 90 percent a decrease in permeability is observed, due probably to the plugging effect of the calcium chloride hydrate formed by the acid-carbonate reaction.

Curve E of FIGURE 2 indicates that the subsequent injection of an aqueous washing fluid results in a further increase in permeability for any given hydrogen chloride concentration. From the data available this effect appears to be most pronounced at concentrations of about 60 percent hydrogen chloride or less and in the immediate vicinity of 100 percent hydrogen chloride. However, it is thought likely that the data point obtained at 89 percent hydrogen chloride after injection of the washing solution is inaccurate and that the actual increase in permeability should be much greater, thus resulting in a shape for curve E conforming more closely to that of curve D.

As a further indication of the acidizing efficiency of the invention at different hydrogen chloride concentrations in the gaseous injection mixture, an efficiency index was determined for each of the aforementioned tests. This index was calculated by dividing the percentage increase or decrease in permeability by the moles of hydrogen chloride consumed. In FIGURE 3 the efficiency index I (multiplied by $10^{-4}$) is plotted on the ordinate against the concentration C of hydrogen chloride in the hydrogen chloride-nitrogen mixture on the abscissa, with curve F indicating the efficiency index after injection of the acidizing mixture but before injection of the aqueous washing liquid and curve G indicating this index upon completion of the washing step.

As can be seen from an examination of FIGURE 3, it is desirable from the standpoint of hydrogen chloride consumption to utilize an acidizing mixture in which the hydrogen chloride concentration is within the range of 60 to 80 percent, with the most effective utilization of hydrogen chloride occurring with a mixture of about two parts hydrogen chloride to one part nitrogen. The apparent tendency of the efficiency index to improve at low hydrogen chloride concentrations is believed to be erroneous, due probably to analytical errors in determining the amount of hydrogen chloride consumed at the 9 percent hydrogen chloride data point. Also, the concavity occurring in curve G is thought to be due to experimental inaccuracies for the 89 percent hydrogen chloride point as discussed above.

In the broadest aspect of the invention, the acidizing mixture may include the acid gas and diluent gas in any proportions desired. However, it is preferred in carrying out the invention to provide an acid gas concentration in the acid gas-diluent gas mixture within the range of 60 to 80 percent by volume. Injection of the acidizing mixture containing an acid gas within this range is most desirable from the standpoint of the percentage improvement in average permeability, efficient utilization of acid, and effective penetration of live acid into the formation from the wellbore.

From the standpoint of good penetration depth of the acid and giving less consideration to overall permeability enhancement and efficiency of acid utilization, somewhat lower concentrations of the acid gas in the acid gas-diluent gas mixture may be used, and the acid gas may be present in the mixture in a concentration within the range of 30 to 80 percent by volume. As indicated by FIGURE 1B, the concentration of hydrogen chloride within the lower portion of this range will still result in relatively good acid penetration although the overall permeability increase and acid utilization efficiency falls off.

While acid gas concentrations outside of the aforementioned ranges may be used, it usually will be desirable to avoid injecting the acid gas in a concentration above 90 percent by volume. At acid gas concentrations above 90 percent, plugging of the formation may actually result in a decrease in permeability as indicated by curve D of FIGURE 2. While curve E indicates that considerable permeability improvement can be obtained by the subsequent injection of the aqueous washing fluid, it is doubtful that the experimental results observed can be duplicated in actual field operations. In this regard, formation of plugging deposits within the formation may so decrease its permeability that good penetration of water into the formation can be obtained only with difficulty, if at all. Thus, it usually will be desirable in carrying out the invention to maintain the acid gas in the injection mixture in an amount of not more than 90 percent by volume.

Having described specific embodiments of the instant invention, it will be understood that further modifications thereof may be suggested to those skilled in the art, and it is intended to cover all such modifications as fall within the scope of the appended claims.

What is claimed is:

1. In the acidizing of a subterranean water-containing formation having carbonate material therein and penetrated by a well, the method comprising injecting into said formation from said well a mixture of a diluent gas and an acid gas selected from the class consisting of hydrogen chloride, hydrogen bromide, and hydrogen iodide, whereby said acid gas dissolves in water within said formation to form an acid which reacts with said carbonate material.

2. The method of claim 1 further comprising injecting water from said well into said formation subsequent to the injection of said acid gas-diluent gas mixture.

3. The method of claim 2 further comprising subsequent to said water injection step injecting an inert gas from said well into said formation and thereafter again injecting a mixture of diluent gas and an acid gas selected from the class consisting of hydrogen chloride, hydrogen bromide, and hydrogen iodide.

4. In the acidizing of a subterranean water-containing formation penetrated by a well, the method comprising injecting into said formation from said well a mixture of a diluent gas and an acid gas which is soluble in water within said formation to form an acid reactive with material contained within said formation, the concentration of said acid gas in said acid gas-diluent gas mixture being within the range of 60 to 80 percent by volume.

5. The method of claim 4 wherein said mixture has a volumetric ratio of about two parts acid gas to one part diluent gas.

6. In the acidizing of a subterranean water-containing formation penetrated by a well, the method comprising injecting into said formation from said well a mixture of a diluent gas and an acid gas which is soluble in water within said formation to form an acid reactive with material contained within said formation, and subsequent to the injection of said acid gas-diluent gas mixture injecting water from said well into said formation.

7. The method of claim 6 further comprising, subsequent to said water injection step, injecting an inert gas from said well into said formation and thereafter again injecting a mixture of an acid gas and a diluent gas.

8. In the acidizing of a subterranean water-containing formation having carbonate material therein and penetrated by a well, the method comprising, injecting into said formation from said well a mixture of a diluent gas and gaseous hydrogen chloride whereby said hydrogen chloride dissolves in water within said formation to form hydrochloric acid which reacts with said carbonate material.

9. The method of claim 8 wherein the concentration of hydrogen chloride in said hydrogen chloride-diluent gas mixture is not more than 90 percent by volume.

10. The method of claim 8 wherein the concentration of hydrogen chloride in said hydrogen chloride-diluent gas mixture is within the range of 30 to 80 percent by volume.

11. The method of claim 8 wehrein the concentration of hydrogen chloride in said hydrogen chloride-diluent gas mixture is within the range of 60 to 80 percent by volume.

12. The method of claim 8 wherein said mixture has a volumetric ratio of about two parts hydrogen chloride to one part diluent gas.

13. The method of claim 8 wherein said diluent gas is selected from the class consisting of nitrogen, carbon dioxide, methane, and mixtures thereof.

14. The method of claim 8 further comprising, prior to the injection of said diluent gas-hydrogen chloride mixture, injecting an inert gas from said well into said formation in order to displace water from said formation adjacent said well.

15. The method of claim 8 further comprising injecting water from said well into said formation subsequent to the injection of said hydrogen chloride-diluent gas mixture.

16. The method of claim 15 further comprising, subsequent to said water injection step, injecting an inert gas from said well into said formation and thereafter again injecting a mixture of diluent gas and hydrogen chloride.

References Cited

UNITED STATES PATENTS

| | | | |
|---|---|---|---|
| 1,999,146 | 4/1935 | Ambrose et al. | 166—307 |
| 2,675,083 | 4/1954 | Bond et al. | 166—307 |
| 2,850,098 | 9/1958 | Moll et al. | 166—307 |
| 3,076,762 | 2/1963 | Dill | 166—307 |
| 3,100,528 | 8/1963 | Plummer et al. | 166—307 X |
| 3,354,957 | 11/1967 | Every et al. | 252—8.55 X |

STEPHEN J. NOVOSAD, Primary Examiner

U.S. Cl. X.R.

166—307